US011879629B2

(12) United States Patent
Calaceto et al.

(10) Patent No.: US 11,879,629 B2
(45) Date of Patent: Jan. 23, 2024

(54) LED LIGHT FIXTURE WITH A HEAT SINK HAVING CONCENTRICALLY SEGMENTED FINS

(71) Applicant: RAB Lighting Inc., Northvale, NJ (US)

(72) Inventors: Nicholas Calaceto, Paramus, NJ (US); Dan Wang-Munson, Bergenfield, NJ (US)

(73) Assignee: RAB Lighting Inc., New York, NY (US)

( * ) Notice: Subject to any disclaimer, the term of this patent is extended or adjusted under 35 U.S.C. 154(b) by 0 days.

(21) Appl. No.: 17/710,354

(22) Filed: Mar. 31, 2022

(65) Prior Publication Data

US 2023/0313982 A1 Oct. 5, 2023

(51) Int. Cl.
*F21V 29/77* (2015.01)
*F21V 7/04* (2006.01)
*F21V 29/508* (2015.01)

(52) U.S. Cl.
CPC .............. *F21V 29/773* (2015.01); *F21V 7/04* (2013.01); *F21V 29/508* (2015.01)

(58) Field of Classification Search
CPC ...... F21V 7/0008; F21V 7/0066; F21V 29/77; F21V 29/777; F21V 29/773; F21Y 2105/10; F21Y 2105/18
See application file for complete search history.

(56) References Cited

U.S. PATENT DOCUMENTS 6,871,993 B2 * 3/2005 Hecht .................... F21V 29/74 362/345
D573,111 S 7/2008 Liu et al.
7,611,264 B1 * 11/2009 Chang .................... F21V 29/77 362/249.02
7,682,049 B2 * 3/2010 Zheng .................. F21V 29/773 362/249.02
7,726,846 B2 * 6/2010 Yang .................... F21V 29/773 362/244

(Continued)

FOREIGN PATENT DOCUMENTS

CN 112484004 A * 3/2021
CN 112484004 A 3/2021

(Continued)

OTHER PUBLICATIONS

RAB Lighting Inc., Porto and Porto XL Installation, 2022, RAB Lighting Inc., New York, NY.

(Continued)

*Primary Examiner* — Ismael Negron

(74) *Attorney, Agent, or Firm* — Innovation Law Office; Dennis S. Schell

(57) ABSTRACT

An LED light fixture includes a heat dissipation structure defining a first housing member and a plurality of concentric fin sets. A circuit board is thermally coupled to a side of the first housing member opposite the concentric fin sets, a plurality of light emitters is thermally coupled and mounted to a region of the circuit board overlying a first set of concentric fins, and a driver circuit is coupled and mounted to a region of the circuit board overlying a second set of concentric fins. A reflector spans between the circuit board and a second housing member, and a lens spans between the first and second housing member and provides light transmission therethrough.

23 Claims, 4 Drawing Sheets

(56) References Cited

U.S. PATENT DOCUMENTS

| | | | | |
|---|---|---|---|---|
| 7,888,851 | B2 * | 2/2011 | Yang | F21K 9/00 362/547 |
| D642,316 | S | 7/2011 | Zheng et al. | |
| 7,988,346 | B2 * | 8/2011 | Helms | F21V 23/04 362/546 |
| 8,109,654 | B2 * | 2/2012 | Mo | F21V 29/70 362/249.02 |
| D657,088 | S | 4/2012 | Miró | |
| 8,220,961 | B2 * | 7/2012 | Belknap | F21V 13/04 362/240 |
| 8,297,798 | B1 * | 10/2012 | Pittman | F21V 7/0016 362/241 |
| 8,308,319 | B2 * | 11/2012 | Kong | F21V 17/14 362/240 |
| 8,573,802 | B2 * | 11/2013 | Hong | F21V 7/0041 362/345 |
| 8,985,816 | B2 * | 3/2015 | Guercio | F21V 29/507 362/147 |
| 9,121,554 | B2 * | 9/2015 | Shimizu | F21V 5/045 |
| D747,534 | S | 1/2016 | Guercio | |
| D750,317 | S | 2/2016 | Lui et al. | |
| D751,748 | S | 3/2016 | Guercio | |
| 9,347,655 | B2 * | 5/2016 | Boomgaarden | F21K 9/65 |
| 9,441,634 | B2 * | 9/2016 | Spiro | F21V 29/508 |
| 9,581,324 | B2 * | 2/2017 | Zhai | F21V 21/08 |
| 9,702,539 | B2 * | 7/2017 | Scarlata | F21V 29/773 |
| D875,292 | S | 2/2020 | Zhou et al. | |
| 2008/0151541 | A1 * | 6/2008 | Heffington | H04N 9/315 348/E9.027 |
| 2008/0285271 | A1 * | 11/2008 | Roberge | F21V 29/80 362/373 |
| 2011/0002124 | A1 * | 1/2011 | Chang | F21V 29/77 362/294 |
| 2011/0026249 | A1 * | 2/2011 | Wylde | F21V 7/0025 362/240 |
| 2016/0298913 | A1 * | 10/2016 | Guo | F28F 13/18 |
| 2017/0153016 | A1 * | 6/2017 | Lee | F21V 29/77 |
| 2020/0284421 | A1 | 9/2020 | Spiro | |

FOREIGN PATENT DOCUMENTS

| | | | |
|---|---|---|---|
| WO | 2014027755 | A1 | 2/2014 |
| WO | 2020148037 | A1 | 7/2020 |

OTHER PUBLICATIONS

RAB Lighting Inc., Porto Datasheet, RAB Lighting Inc., New York, NY.

* cited by examiner

LED LIGHT FIXTURE WITH A HEAT SINK HAVING CONCENTRICALLY SEGMENTED FINS

TECHNICAL FIELD

Embodiments of this disclosure relate generally to ceiling and pendent mount LED light fixtures, and more particularly to thermal and optical management for LED light fixtures.

BACKGROUND AND SUMMARY

Embodiments of the present disclosure provide an LED light fixture, including a heat dissipation structure defining a first housing member and a plurality of concentric fin sets. A circuit board is thermally coupled to a side of the first housing member opposite the concentric fin sets, a plurality of light emitters is thermally coupled and mounted to a region of the circuit board overlying a first set of concentric fins, and a driver circuit is coupled and mounted to a region of the circuit board overlying a second set of concentric fins. A reflector spans between the circuit board and a second housing member, and a lens spans between the first and second housing member and provides light transmission therethrough.

In one illustrative embodiment a light fixture, comprises a heat dissipation structure, the heat dissipation structure formed as a unitary structure and defining: a first housing member defining first and second sides; and a plurality of concentric fin sets extending from the first side of the first housing member, first and second sets of an adjacent concentric pair of the plurality of concentric fin sets defining a first open channel therebetween; a plurality of light emitters thermally coupled to and more proximate to the first set of the plurality of concentric fin sets than the second set of the plurality of concentric fin sets; and a driver circuit thermally coupled to and more proximate to the second set of the plurality of concentric fin sets than the first set of the plurality of concentric fin sets. The light fixture may further comprise a reflector located and formed to redirect light emission to a first direction perpendicular to the first side of the first housing member and away from a second direction perpendicular to the second side of the first housing member. The light fixture may further comprise a second housing member and wherein the reflector is located between the first housing member and the second housing member. The light fixture may further comprise an optical member, and wherein the optical member spans between the first housing member and the second housing member and provides light emission therethrough.

The reflector can be further located and formed to redirect light emission to a direction perpendicular to the first and second directions. The reflector may form a curvilinear annulus shape for redirecting light emissions from the plurality of light emitters. The plurality of light emitters may form a perimeter. The perimeter may be located around the driver circuit. The perimeter may be circular.

The second set of the plurality of concentric fin sets may be located within the first set of the plurality of concentric fin sets.

The heat dissipation structure may further define an opening for receiving and mounting a sensor therein. The heat dissipation structure may further form a cylinder extending distally from the first side and opening is defined at a distal end of the cylinder. The opening may be closed by a plug that is removeable for mounting the sensor therein.

The plurality of concentric fin sets may include a third set of the plurality of concentric fin sets, the third set located within the second set and defining: a second open channel between the first set and the second set; and a cavity defined within the third set of plurality of contiguous fins, the cavity formed to receive a sensor therein.

A first portion of the first housing member overlying the first open channel may define a minimum thickness of the first housing member between the first side and the second side, thereby minimizing thermal transmission across the first portion of the first housing member.

The light fixture may further comprise a circuit board thermally coupled to and adjoining the second side of the first housing member; and wherein: the plurality of light emitters is mounted to a first region of the circuit board overlying the first set of the plurality of concentric fin sets; and the driver circuit is mounted to a second region of the circuit board overlying the second set of the plurality of concentric fin sets. The first housing member may be is contiguous between and across both the first region and the second region. The first housing member may define a flat plate spanning the circuit board.

In another illustrative embodiment, a light fixture, comprises a heat dissipation structure defining: a first housing member defining first and second sides; and a plurality of concentric fin sets extending from the first side of the first housing member, first and second sets of an adjacent concentric pair of the plurality of concentric fin sets defining a first open channel therebetween; a circuit board thermally coupled to and adjoining the second side of the first housing member; a plurality of light emitters coupled to a first region of the circuit board overlying the first set of the plurality of concentric fin sets; and a driver circuit thermally coupled and mounted to a second region of the circuit board overlying the second set of the plurality of concentric fin sets; and wherein a first portion of the first housing member overlying the first open channel defines a minimum thickness of the first housing member between the first side and the second side, thereby minimizing thermal transmission across the first portion of the first housing member.

The heat dissipation structure may further form a projection extending distally from the first side; the projection defines an opening for receiving and mounting a sensor therein; and the opening is defined at a distal end of the cylinder.

In yet another illustrative embodiment, a light fixture comprises a heat dissipation structure defining: a first housing member defining first and second sides; and a plurality of concentric fin sets extending from the first side of the first housing member; a circuit board thermally coupled to and adjoining the second side of the first housing member; a second housing member overlying and spaced apart from the second side of the first housing; a reflector located between the circuit board and the second housing; an optical member spanning between the first housing member and the second housing member and providing light emission therethrough; and a plurality of light emitters thermally coupled and mounted to a first region of the circuit board overlying a first set of the plurality of concentric fin sets, the plurality of light emitters located between the reflector and the optical member.

The light fixture may further comprises a driver circuit thermally coupled and mounted to a second region of the circuit board overlying a second set of the plurality of concentric fin sets, and wherein the heat dissipation structure further defines a first open channel between the first and second sets of an adjacent concentric pair of the plurality of concentric fin sets and extending from the second side of the first housing member.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as many different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
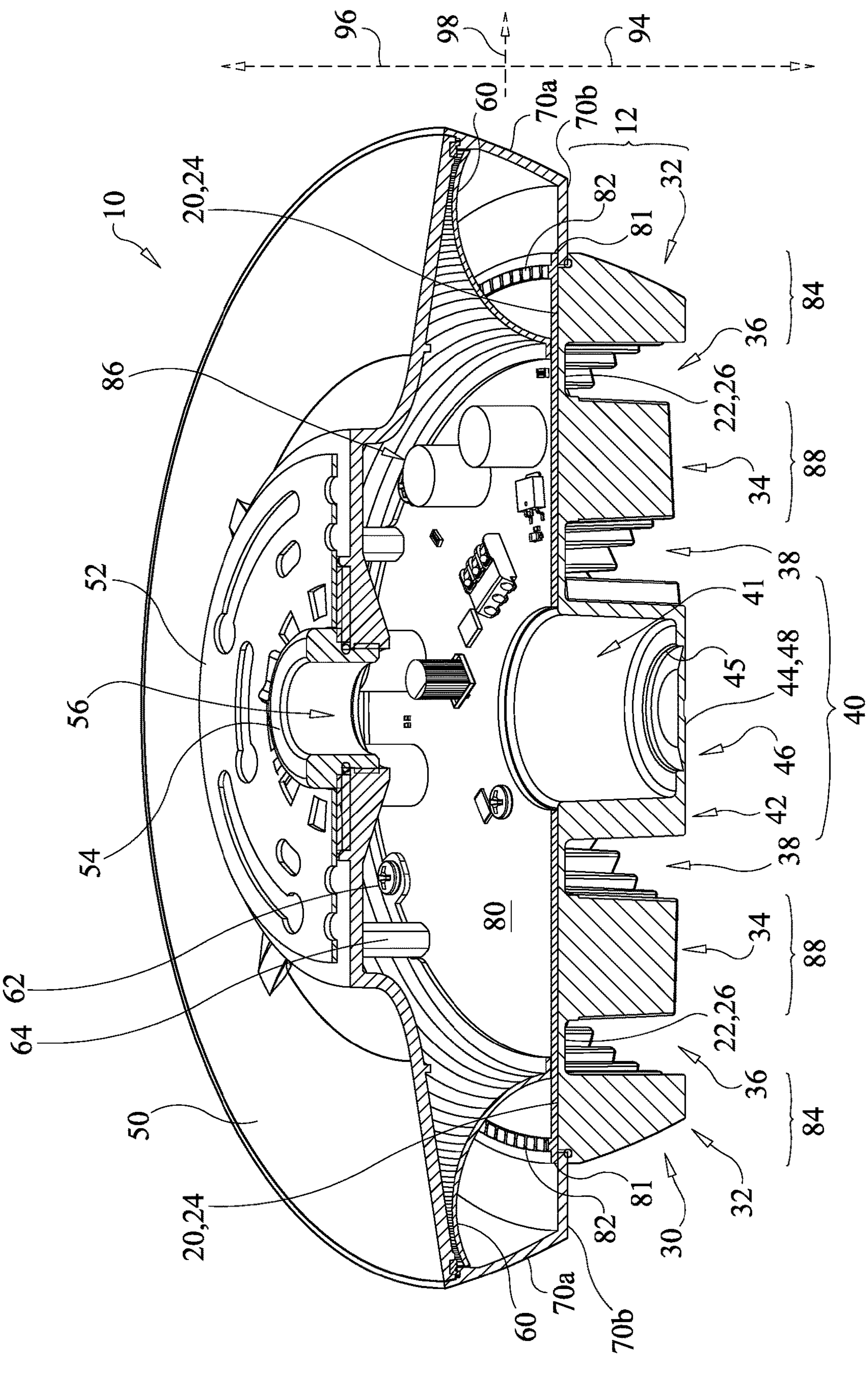
FIG. 1 is a perspective vertical cross-sectional view of an illustrative embodiment of a light fixture according to the present disclosure, taken along section lines 1-1 of FIG. 3.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Figure 2:
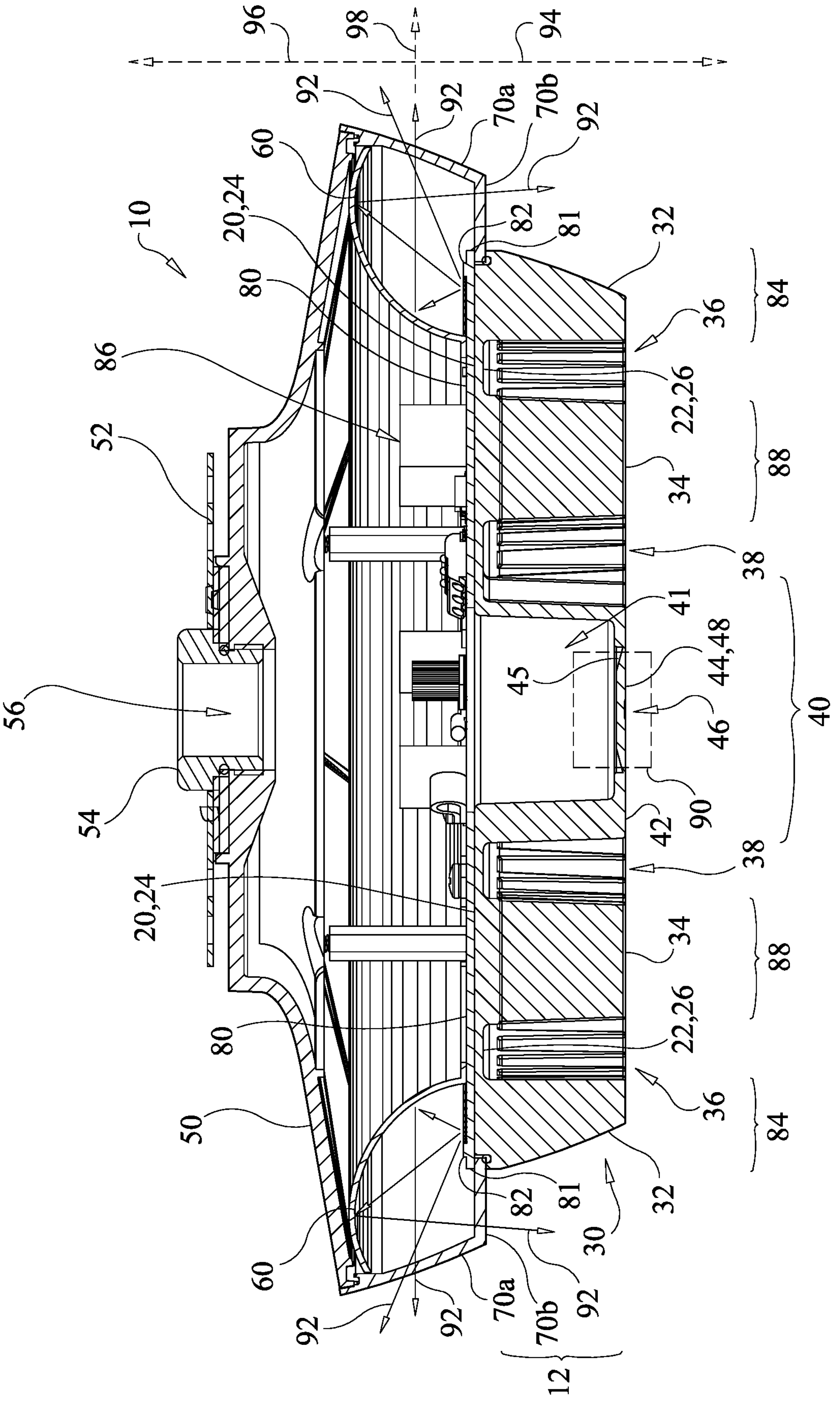
FIG. 2 is a is a vertical cross-sectional view of the light fixture of FIG. 1, taken along section lines 2-2 of FIG. 3.

Depicted in FIGS. 1 and 2 are vertical cross-sectional views of an illustrative embodiment of an LED light fixture 10 according to the present disclosure. The light fixture 10 includes generally a heat dissipation structure 12 defining a first housing member 20 and concentric fin sets 30, a second housing member 50, a reflector 60, an optical member 70, also referred to as a lens, and a circuit board 80, including a light emitter (i.e. source) 82.

The concentric fin sets 30 includes a first set 32 and a second set 34, each set of which can be integrally formed with the first housing member 20, for example, as a single casting. Concentric fin sets 30 protrude downwardly in a first direction 94 from a first side 22 of the first housing member. The first housing member 20 can define a flat plate, for example, a circular flat plate. The circuit board 80 adjoins a second side 24 of the first housing member 20, the second side opposite the first side 22. Advantageously to maximize heat transfer from circuit board 80 to heat dissipation structure 12, in the illustrative embodiment, the circuit board, for example a metal core printed circuit board, is thermally coupled to and mounted to, for example, stacked in a layer against, the second side 24 of the first housing member, with an optional intervening thermal interface material, such as a thermally conductive paste.

The circuit board 80 includes light emitters 82 providing a source of light, for example, LEDs mounted to the circuit board, for example, adjacent an edge perimeter 81 of the circuit board. The light emitters 82 can form a perimeter around the circuit board 80 in a first region 84 of the circuit board that is most proximate to, for example, overlying, i.e., aligned with and therefore highly thermally conductive with, the first set of fins 32 of the heat dissipation structure 12, and less proximate to the second set of fins 34. In the illustrative embodiment, the light emitters 82 are equally spaced adjacent the entire edge perimeter 81 of the circular circuit board 80. Also in the illustrative embodiment, the light emitters 82 lack an attached optical lens as the reflector 60, discussed below, redirects at portion of the light emissions 92.

The circuit board 80 also includes a driver circuit 86, e.g. a power supply or power convertor, for providing power to the light emitters 82, for example, converting an AC supply to constant current DC as is typically used for LEDs. Advantageously, the driver circuit 86 can be mounted and thermally coupled with the circuit board 80 in a second region 88 of the circuit board that is most proximate to, for example, overlying, i.e., aligned with and therefore highly thermally conductive with, the second set of fins 34 of the heat dissipation structure 12, and less proximate to the first set of fins 3262. In the illustrative embodiment, driver circuit 86 is spaced apart on the circuit board 80 from the light emitters 82, for example, by at least the distance between the first region 84 and the second region 88, thus minimizing the heat transmission between the driver circuit 86 and the light emitters 82.

Figure 3:
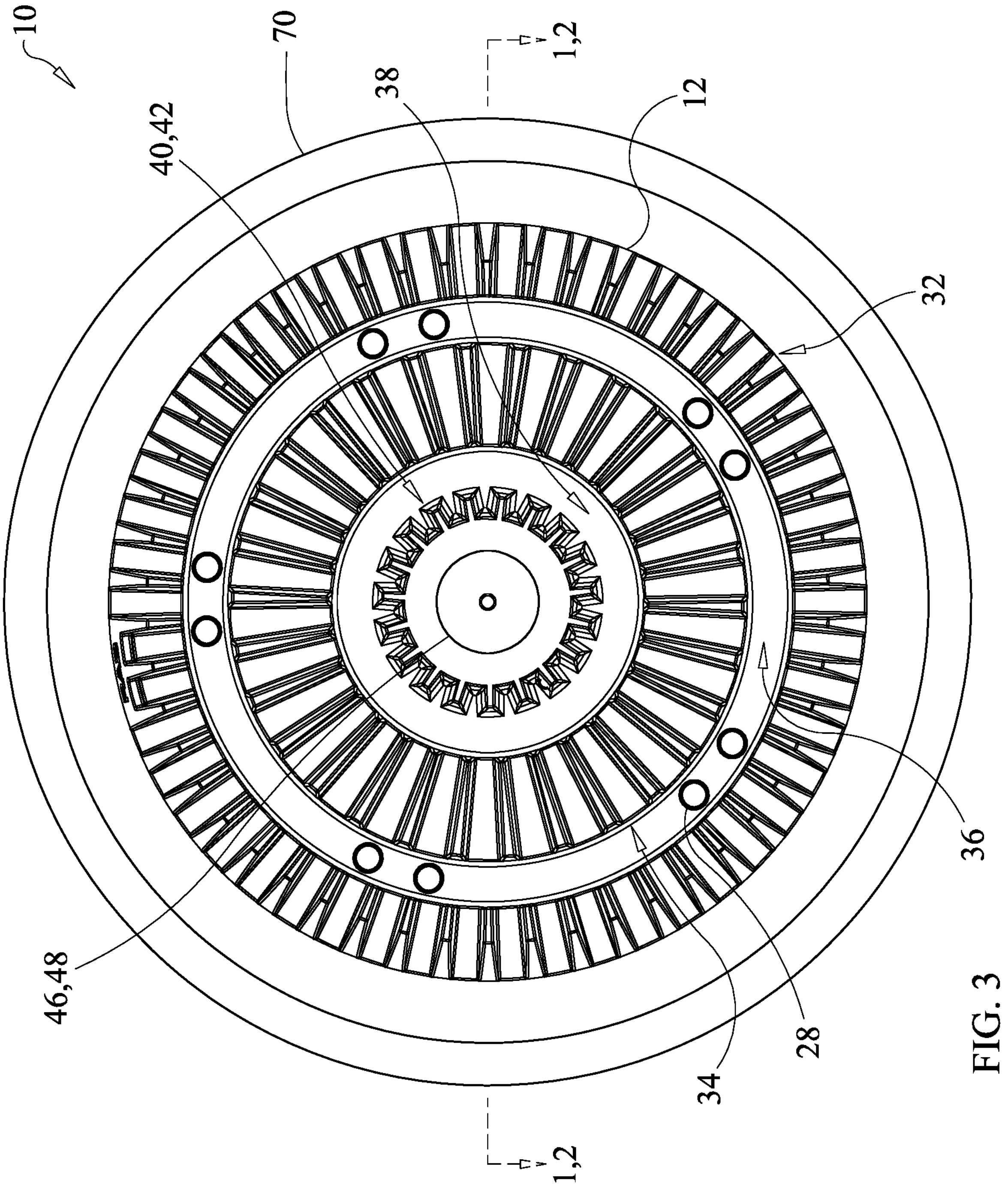
FIG. 3 is a is bottom view of the light fixture of FIG. 1.

Referring to FIGS. 1 and 3, the first set of fins 32 maximize thermal dissipation into the surrounding air heat from light emitters 82 via the first region 84 of the circuit board 80 and the portion of the first housing member 20 from which the first set of fins 32 distally protrude in the first direction 94. Similarly, the second set of fins 34 maximize thermal dissipation into the surrounding air heat from driver circuit 86 via the second region 88 of the circuit board 80 and the portion of the first housing member 20 from which the second set of fins 34 protrude in the first direction 94. Between the first and second set of fins 32 and 34 is a first channel 36 defining a space between the first and second sets of fins, and first portion 26 of first housing member 20, for example, the minimum thickness of first housing member 20, to thereby minimize any heat transfer between the first and second set of fins 32 and 34 and between the respective associated light emitters 82 and driver circuit 86. By minimizing heat transfer between light emitters 82 and driver circuit 86, the reliability and lifespan of these components may be increased.

In an alternative embodiment, the circuit board 80 includes a first circuit board for mounting and thermally coupling the light emitters 82 to the first set of fins 32, and a separate second circuit board for mounting and thermally coupling the driver circuit 86 to the second set of fins 34.

Figure 4:
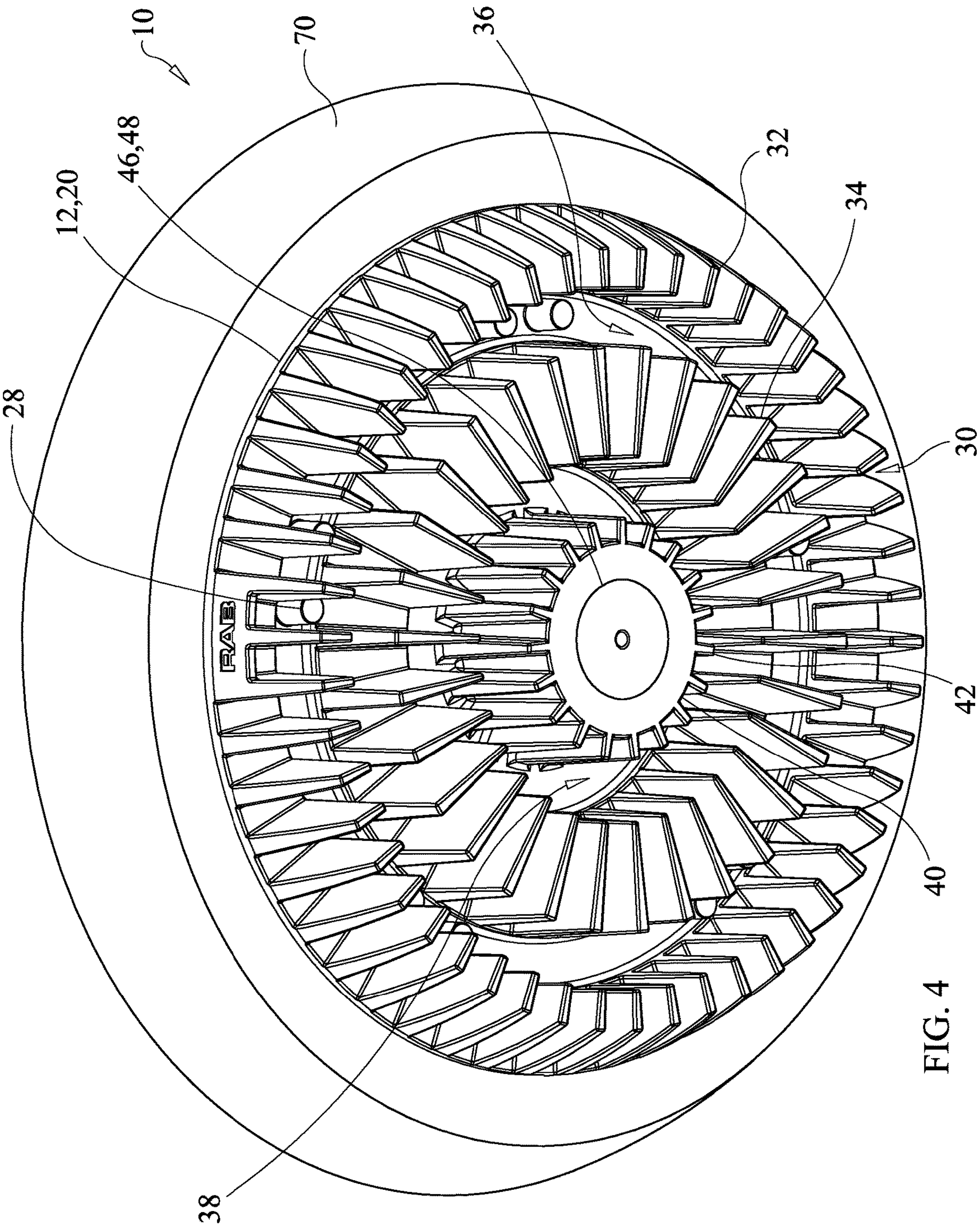
FIG. 4 is a is bottom perspective view of the light fixture of FIG. 1.

As shown in FIGS. 3 and 4, each of the first and second fin sets 32 and 34 may include equally spaced heat dissipation fins, for example, each forming an annular ring, the second fin set located inside of, i.e., having a smaller diameter than and located concentrically within, the first fin set. The heat dissipation structure 12 can be formed from a highly heat conductive material, for example, aluminum or an aluminum alloy.

The heat dissipation structure 12 may also include a central cylinder 40 protruding in a first direction 94 from the first housing member 20, and optionally including a third fin set 42 extending radial along the cylinder 40 to dissipate heat into the surrounding air from the cylinder 40. The cylinder 40 and/or third fin set 42 may also define with the second fins set 34 a second channel 38 and a thinned portion of the first housing member 20 to minimize thermal conduction between the two as described above for first channel 36 and first portion 26. The cylinder 40 and optional third fin set 42 can also be integrally formed with the first housing member 20 and first and second fin sets 32 and 34 of the heat dissipation structure 12.

Advantageously, the cylinder 40 may define a cavity 41 and at a distal end 44 an opening 46 optionally closed by a removable plug 48. For example, the plug 48 may be pressed into, screwed into, or held into place by a breakable thinned structure 45 of the distal end 44 so that it can be removed for the mounting of an optional sensor 90 in the opening 46, for example, including, but not limited to one or more of a light sensor, a vacancy/occupancy sensor, and a wireless transceiver. In the illustrative embodiment of light fixture 10, the distal end 44 of the cylinder 40 is located at a distance from the first side 22 of the first housing member 20 to equal or exceed the distance the concentric fin sets 30 protrude from the first housing member 20 so that the optional sensor 90 is not obscured by the concentric fin sets in all directions between the first direction 94 and the perpendicular directions 98.

Referring to FIGS. 1 and 2, the illustrative embodiment includes a second housing member 50 overlying and spaced apart from the first housing member 20. The second housing member 50 optionally includes a mounting plate 52 to mount the light fixture 10 to an electrical box (not shown) or ceiling. Additionally or alternatively, the second housing member can include an adaptor 54, for example, to mount the light fixture from a pendent. An opening 56 defined in the adaptor 54, mounting plate 52, and the second housing member 50 can be used to provide power to the circuit board 80, for example, AC power.

An optical member 70, e.g. a lens, diffuser, or other light transmissive member, spans between the first housing member and the second housing member and provides light emission therethrough. The optical member 70, may include a portion **70*a* perpendicular to the perpendicular direction 98 and a portion 70*b* perpendicular to the first direction 94. The portion 70*a* provides transmission of light emissions 92 from the light fixture and about the perpendicular direction 98 and the portion 70*b* provides transmission of light emissions 92 from the light fixture about the first direction 94. As illustrated in FIG. 2 some of the light emissions 92 transmitted through portion 70*a* of the optical member 70 are directed slightly upward in the second direction 96, toward a surface of a ceiling or other structure (not shown) to which the light fixture 10 is mounted. Illumination of the ceiling or other mounting structure has been found to be important aesthetically and functionally to eliminate the 'cave effect' of only the area at the level of and below the light fixture 10** being illuminated.

A reflector 60 spans between the circuit board 80 and second housing member 50, thereby enclosing the light emitters 82 between the reflector 60 and optical member/lens 70 in the illustrative embodiment. Advantageously, the reflector 60 includes a mirrored specular finish and is located and formed to redirect light emissions 92 about (i.e. toward and around) the first direction 98, e.g., perpendicular to the first side 22 of the first housing member 20, away from a second direction 96 perpendicular to the second side 24 of the first housing member, and about (i.e. toward and around) a perpendicular direction 98 to the first and second directions. For example, in the illustrative embodiment the reflector 60 forms a curvilinear annulus shaped for redirecting light emissions 92 from the light emitters 82 outwardly in perpendicular direction 98 and downwardly in first direction 94. In an alternative embodiment, at least a portion of the reflector 60 and the second housing member 50 are somewhat transmissive, allowing a portion of the light to pass through the reflector and the second housing member, thus illuminating a portion of the ceiling or other structure to which light fixture 10 is mounted that is located directly above the light fixture.

Posts 28 shown in FIGS. 3 and 4 extending in a first direction 94 from the first housing member 20 are optionally included for providing structure to define a longer bored thread (not shown) for anchoring fasteners 62 (FIG. 1) that are used to retain reflector 60 and circuit board 80 to the first housing member, and for anchoring standoffs 64 (FIG. 1) or other fasteners that are used to retain the second housing member 50 to the first housing member.

In the illustrative embodiment, the first housing member 20, second housing member 50, and optical member 70 sealingly enclose the light fixture 10, optionally except for an opening 56 provided to connect an electrical supply to the driver circuit 86.

Reference systems that may be used herein can refer generally to various directions (e.g., upper, lower, forward, rearward, upward and downward), which are merely offered to assist the reader in understanding the various embodiments of the disclosure and are not to be interpreted as limiting. Other reference systems may be used to describe various embodiments.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A light fixture, comprising:
- a heat dissipation structure, the heat dissipation structure formed as a unitary structure and defining:
  - a first housing member defining first and second sides; and
  - a plurality of concentric fin sets extending from the first side of the first housing member, first and second sets of an adjacent concentric pair of the plurality of concentric fin sets defining a first open channel therebetween;
- a plurality of light emitters thermally coupled to and more proximate to the first set of the plurality of concentric fin sets than the second set of the plurality of concentric fin sets, and the plurality of light emitters located on the second side of the first housing member; and
- a driver circuit thermally coupled to and more proximate to the second set of the plurality of concentric fin sets than the first set of the plurality of concentric fin sets.

2. The light fixture of claim 1, further comprising a reflector, and wherein the reflector forms a curvilinear annulus shape for redirecting light emissions from the plurality of light emitters.

3. The light fixture of claim 1, wherein:
- the second set of the plurality of concentric fin sets is located within the first set of the plurality of concentric fin sets; and
- the first and second sets of the plurality of concentric fin sets extend equidistantly from the first side of the first housing member.

4. The light fixture of claim 1, wherein the plurality of concentric fin sets includes a third set of the plurality of concentric fin sets, the third set located within the second set and defining:
- a second open channel between the third set and the second set; and
- a cavity defined within the third set of the plurality of concentric fins, the cavity formed to receive a sensor therein.

5. The light fixture of claim 1, wherein a first portion of the first housing member overlying the first open channel defines a minimum thickness of the first housing member between the first side and the second side, thereby minimizing thermal transmission across the first portion of the first housing member.

6. The light fixture of claim 1, wherein the plurality of light emitters forms a perimeter adjacent the second side of the first housing member.

7. The light fixture of claim 6, wherein the perimeter is located around the driver circuit.

8. The light fixture of claim 6, wherein the perimeter is circular.

9. The light fixture of claim 1, wherein the heat dissipation structure further defines an opening adapted for receiving and mounting a sensor therein.

10. The light fixture of claim 9, wherein the heat dissipation structure further forms a cylinder extending distally from the first side, and the opening is defined at a distal end of the cylinder.

11. The light fixture of claim 9, wherein the opening is closed by a plug that is removeable for mounting the sensor therein.

12. The light fixture of claim 1, wherein:
- the driver circuit includes a circuit board thermally coupled to and adjoining the second side of the first housing member;
- the plurality of light emitters is mounted to a first region of the circuit board overlying the first set of the plurality of concentric fin sets; and
- the driver circuit is mounted to a second region of the circuit board overlying the second set of the plurality of concentric fin sets.

13. The light fixture of claim 12, wherein the first housing member is contiguous between and across both the first region and the second region.

14. The light fixture of claim 12, wherein the first housing member defines a flat plate spanning the circuit board.

15. The light fixture of claim 1, further comprising a reflector located and formed to redirect light emission to a first direction perpendicular to the first side of the first housing member, away from a second direction perpendicular to the second side of the first housing member and beyond the first housing member.

16. The light fixture of claim 15, wherein the reflector is further located and formed to redirect light emission to a direction perpendicular to the first and second directions.

17. The light fixture of claim 15, further comprising a second housing member and wherein the reflector is located between the first housing member and the second housing member.

18. The light fixture of claim 17, further comprising an optical member, and wherein the optical member spans between the first housing member and the second housing member and provides light emission therethrough.

19. A light fixture, comprising:
- a heat dissipation structure defining:
  - a first housing member defining first and second sides; and
  - a plurality of concentric fin sets extending from the first side of the first housing member, first and second sets of an adjacent concentric pair of the plurality of concentric fin sets defining a first open channel therebetween;
- a circuit board thermally coupled to and adjoining the second side of the first housing member;
- a plurality of light emitters coupled to a first region of the circuit board overlying the first set of the plurality of concentric fin sets; and a driver circuit thermally coupled and mounted to a second region of the circuit board overlying the second set of the plurality of concentric fin sets; and wherein a first portion of the first housing member overlying the first open channel defines a minimum thickness of the first housing member between the first side and the second side, thereby minimizing thermal transmission across the first portion of the first housing member.

20. The light fixture of claim 19, wherein:

the heat dissipation structure further forms a projection extending distally from the first side;

the projection defines an opening for receiving and mounting a sensor therein; and the opening is defined at a distal end of the cylinder.

21. A light fixture, comprising:

a heat dissipation structure defining:

a first housing member defining first and second sides; and a plurality of concentric fin sets extending from the first side of the first housing member;

a circuit board thermally coupled to and adjoining the second side of the first housing member;

a second housing member overlying and spaced apart from the second side of the first housing;

a reflector located between the circuit board and the second housing;

an optical member spanning between the first housing member and the second housing member and providing light emission therethrough; and a plurality of light emitters thermally coupled and mounted to a first region of the circuit board overlying a first set of the plurality of concentric fin sets, the plurality of light emitters located between the reflector and the optical member.

22. The light fixture of claim 21, further comprising a driver circuit thermally coupled and mounted to a second region of the circuit board overlying a second set of the plurality of concentric fin sets, and wherein the heat dissipation structure further defines a first open channel between the first and second sets of an adjacent concentric pair of the plurality of concentric fin sets and extending from the first side of the first housing member.

23. A light fixture, comprising:

a heat dissipation structure, the heat dissipation structure formed as a unitary structure and defining:

a first housing member defining first and second sides; and a plurality of concentric fin sets extending from the first side of the first housing member, first and second sets of an adjacent concentric pair of the plurality of concentric fin sets defining a first open channel therebetween;

a plurality of light emitters thermally coupled to and more proximate to the first set of the plurality of concentric fin sets than the second set of the plurality of concentric fin sets;

a driver circuit thermally coupled to and more proximate to the second set of the plurality of concentric fin sets than the first set of the plurality of concentric fin sets;

a reflector located and formed to redirect light emission to a first direction perpendicular to the first side of the first housing member and away from a second direction perpendicular to the second side of the first housing member;

a second housing member and wherein the reflector is located between the first housing member and the second housing member; and an optical member, and wherein the optical member spans between the first housing member and the second housing member and provides light emission therethrough.

* * * * *